US005242151A

United States Patent [19]

Boehm et al.

[11] Patent Number: 5,242,151

[45] Date of Patent: Sep. 7, 1993

[54] FLUID FLOW CONTROL VALVE

[75] Inventors: Wilfreid L. Boehm, Thornton; Kevin T. Dickson, Denver; John R. Hamner, Littleton; Jim D. Perkins, Littleton; John Roedel, Littleton; Christine M. Wardlow, Littleton; Thomas E. Van Dorn, Littleton, all of Colo.

[73] Assignee: Norgren Co., Littleton, Colo.

[21] Appl. No.: 903,754

[22] Filed: Jun. 25, 1992

[51] Int. Cl.[5] .................... F16K 5/06

[52] U.S. Cl. .................... 251/315; 251/144; 251/904

[58] Field of Search .................... 251/315, 904, 144; 137/315

[56] References Cited

U.S. PATENT DOCUMENTS

| | | | |
|---|---|---|---|
| 3,192,943 | 7/1965 | Moen | 137/315 |
| 3,744,558 | 7/1973 | Childress | 137/315 X |
| 4,890,817 | 1/1990 | Uri | 251/904 X |

*Primary Examiner*—John C. Fox
*Attorney, Agent, or Firm*—Cushman, Darby & Cushman

[57] ABSTRACT

A fluid flow control valve of the ball type has a unitary body moulded in an elastomer and defining inlet and outlet passageways and a spherical cavity accommodating a plastic, ball-shaped closure member. The closure member is located in the cavity by forcing it, together with its actuating spindle, through a bore formed in the body until it is sealingly located, as a snap fit, in the cavity, during which process the bore is resiliently deformed outwardly but subsequently resiles into contact with the actuating spindle. The valve may, thus, simply have a pair of injection mouldings and, relative to prior ball valve constructions, is therefore simpler and more economic to manufacture. The body is integrally formed with a peripheral external recess whereby it may readily be sealingly engaged, simply as a snap fit, in, for example, an aperture formed in the base or a compressed sir filter bowl, the valve acting as a manual drain valve.

11 Claims, 1 Drawing Sheet

8
3'
3
6
7
1
5
.145"Ø
.095"R
2
13
4
4'
9
12
10
.183"-
.177Ø
.115"-
.105"R
11
III

FLUID FLOW CONTROL VALVE

BACKGROUND OF THE INVENTION

1. Field of the Invention

This invention relates to a manually operated fluid flow control valve that has especial, but not exclusive, use as a manually-operated drain valve for a compressed air filter.

2. The Prior Art

Compressed air filters conventionally include a bowl, usually made of strong transparent material such as a polycarbonate, in which filtered-out liquid, principally water, and particulate foreign bodies collect during the passage of compressed air through the filter. The collected liquid and foreign bodies are periodically drained off by an automatic drain valve or a manually-operated ("manual") drain valve fitted to the base of the bowl. Hitherto, manual drain valves have conventionally been sealingly secured to the bowl by a threaded nut connection which entails significant assembly time. Further, in order fully to open the usual type of manual drain valve, it is necessary to rotate the valve member through several revolutions, which can be somewhat inconvenient.

It is one object of the present invention to provide a manually-operated drain valve suitable, for example, for use in a compressed air filter, which can, in a preferred embodiment, be readily connected, without the use of a screwed fastener, to the bowl of such a filter.

An additional or alternative object of the invention is to provide such a drain valve which is of the "quarter turn" type, that is to say one which can be moved from a fully closed position to a fully open one, and vice versa, simply by manually rotating an actuator of the valve through about 90°.

SUMMARY OF THE INVENTION

These and other objects of the present invention are accomplished by providing a fluid flow control valve comprising:

a) a body defining within it: a cavity, a first, fluid flow passageway extending from the cavity to a fluid inlet port, a second, fluid flow passageway extending from the cavity to a fluid outlet port, and a third passageway extending through the body to said cavity, said cavity and said third passageway being defined by resiliently deformable material; said body having mounting means, adjacent to said inlet port, for mounting it in sealing engagement with a wall of vessel, pipe or the like to which the valve is to be connected; and b) accommodated in said cavity, as a snug, fluid-tight fit therein, a valve closure member that has been located therein by forcing the said member through said third passageway thereby resiliently deforming said material, said valve closure member having a bore therethrough and being connected to an actuating spindle that extends through, and projects from, said third passageway, said valve closure member being rotatable by rotation of said spindle between a valve-closed position in which said bore is out of register with said first and second passageways and a valve-open position in which said bore interconnects said first and second passageways.

Preferably, the whole of the body is made of a resiliently deformable material, such as an elastomer, and as such it may be in the form of a unitary moulding.

BRIEF DESCRIPTION OF THE DRAWINGS

These and other features of the invention and the attendant advantages will be more easily understood from the following description of the preferred embodiment with reference to the accompanying drawings of which.

DESCRIPTION OF THE PREFERRED EMBODIMENT

Figure 1:
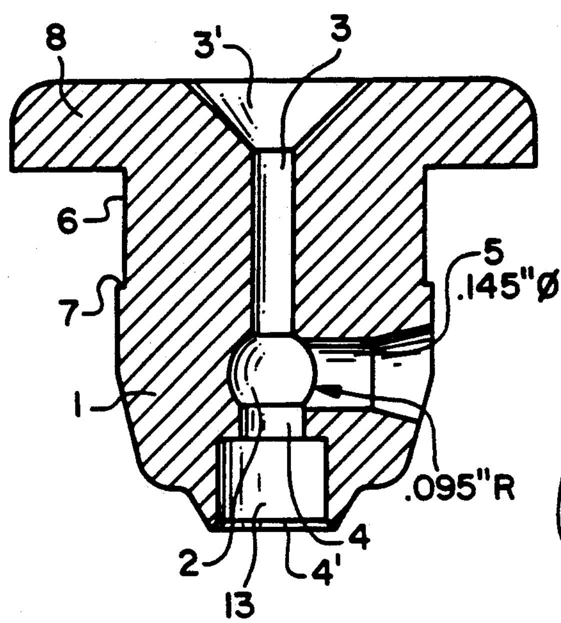
FIG. 1 is a sectional elevation, on a scale of about 2:1, of a drain valve body prior to assembly with the rotatable valve closure member, designed especially for use with a compressed air filter.

Referring to FIG. 1, the generally circular cylindrical valve body 1 consists of a unitary moulding in an elastomer, for example HYTREL (Registered Trade Mark). The body 1 defines within it a part-spherical cavity 2, an axial fluid inlet passageway 3 which communicates the cavity 2 with an inlet port 3', and an axial fluid outlet passageway 4 which communicates the cavity 2 with an outlet port 4', both said passageways being of circular cross-section.

The body 1 further defines a passageway 5 of circular cross-section in communication with the cavity 2 and that extends orthogonally to the passageways 3 and 4. The respective longitudinal axes of all three passageways 3, 4, 5 pass through the spherical centre of the cavity 2 and, as can be seen, the spherical diameter of the cavity 2 is somewhat greater than, in particular, the diameter of the passageway 5.

The external surface of the body 1 has an annular recess 6 defined by a shoulder 7 and part of an annular flange 8 whose upper circumferential edge is radiused. The body 1, being resiliently deformable, may therefore readily be sealingly engaged, as a "snap" fit, into a suitably sized circular aperture formed in the base of a compressed air filter bowl (not shown) with the wall of the bowl defining the aperture engaging in the recess 6 and the underside of the flange 8 engaging the internal surface of the bowl immediately surrounding the aperture.

Figure 2:
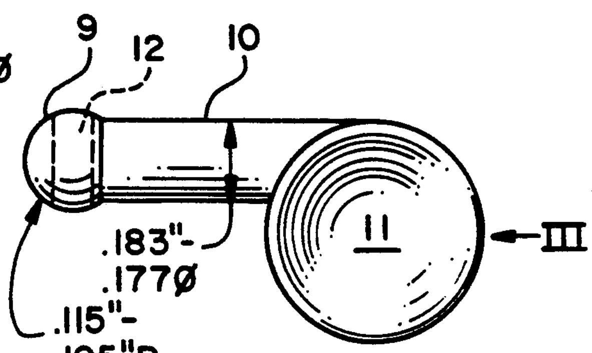
FIG. 2 is a side elevation of the valve closure member, its spindle and handle for assembly with the body of FIG. 1.

Referring additionally to FIG. 2 of the drawings, a valve closure member 9 together with a cylindrical spindle 10 and a disc-shaped handle 11 consist of a unitary moulding in a relatively hard plastics material, for example an acetal co-polymer. The closure member 9 is part spherical, the spherical diameter being slightly greater than the as-formed spherical diameter of the cavity 2 and therefore significantly greater than the diameter of the passageway 5. The closure member 9 has a diametric bore 12 through it whose longitudinal axis intersects, at a right angle, with the axis of the spindle 10. The spindle 10 has a diameter slightly greater than the as-formed diameter of the passageway 5.

The closure member 9 (together with its integral spindle 10 and handle 11) may be assembled with the body 1 simply by pushing it through the passageway 5, whose outer end is tapered, as shown, to facilitate entry of the closure member 9, until it "snap fits" into the now expanded cavity 2 with the wall of which it forms an interference, fluid tight seal. During this operation, the wall defining the passageway 5 becomes distended but, as the closure member 9 advances along it, it resiles into sealing contact with the spindle 10.

Figure 3:
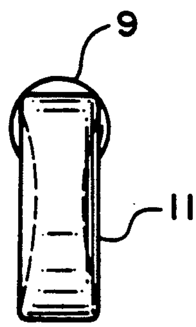
FIG. 3 is a view in the direction of arrow III of FIG. 2.

The valve is operable between a closed position, in which the bore 12 lies orthogonally to the passageways 3 and 4, and an open position, in which the bore 12 is aligned with those passageways, simply by manually rotating the member 9 through about 90° by means of the handle 11 which (as can be seen in FIG. 3) is dimpled in order to facilitate its being gripped between thumb and finger.

As can be seen, the lower end of the outlet passageway 4 is counterbored at 13 and a tube of reasonably large diameter, say ¼" O.D., may be inserted into the counterbore in order to convey liquid from the filter bowl into a receptacle during a draining operation.

Whilst the above description refers specifically to a drain valve for use with a compressed air filter, it will be appreciated that a valve of the invention could, if necessary with appropriate adaption of the body mounting means, be used in a variety of different contexts.

As will also be appreciated, the valve specifically described above is, in essence, a type of ball valve but, relative to most designs of such valves, it is of much simpler construction and therefore should have a lower manufacturing cost. Thus, it has only two parts which may be readily formed by, for example, injection moulding.

The foregoing description describes details of one preferred embodiment but it is to be understood that these details (in particular the dimensions included in the drawings) are illustrative only. Various modifications and adaptions will be readily apparent to those skilled in the art without departing from the spirit and scope of the invention as determined by reference to the appended claims. One such modification, for example, comprises separately forming an insert of resilient material, such as an elastomer, which insert defines the said cavity, the third passageway and, in part, the first and second passageways, and securing the insert in a body made of, for example, a metal or relatively rigid plastics material. Further, the closure member could, of course, be of alternative form, for example in the form of a tapered or cylindrical plug rather than of a ball and the cavity would be correspondingly shaped.

What we claim is:

1. A fluid flow control valve comprising:

a) a unitary body moulded in elastomeric material and defining within it a cavity, a first fluid flow passageway extending from the cavity to a fluid inlet port, a second fluid flow passageway extending from the cavity to a fluid outlet port, and a third passageway extending through the body to said cavity, said cavity and said third passageway being defined by resiliently deformable material, said body having integrally moulded therewith mounting means adjacent to said inlet port for mounting said body in sealing engagement with a wall of a vessel to which the valve is to be connected; and b) accommodated in said cavity, as a snug fluid-tight fit therein, valve closure means for progressively and resiliently deforming said elastomeric material by moving along said third passageway towards said cavity to thereby locate said valve closure means in said cavity, said valve closure means having a bore therethrough and being connected to an actuating spindle that extends through, and projects from, said third passageway, said valve closure means being rotatable by rotation of said spindle between a valve-closed position in which said bore is out of register with said first and second passageways and a valve-open position in which said bore interconnects said first and second passageways.

2. A valve according to claim 1 wherein said material is a synthetic elastomer.

3. A valve according to claim 1 wherein said body is generally cylindrical.

4. A valve according to claim 3 wherein said first and second passageways extend axially within the body and said third passageway extends laterally within the body.

5. A valve according to claim 1 wherein said cavity is substantially spherical and said closure means is in the form of a ball having a diameter slightly greater than the as-formed spherical diameter of the cavity.

6. A valve according to claim 5 wherein the diameter of said third passageway is slightly less than the spherical diameter of said cavity and wherein the diameter of said spindle is slightly greater than the as-formed diameter of said third passageway.

7. A valve according to claim 1 wherein said closure means and said spindle comprise an integral moulding of a relatively rigid plastics material.

8. A valve according to claim 7 wherein said moulding additionally comprises an integral handle on the end of the spindle remote from the closure means.

9. A valve according to claim 1 wherein said body mounting means comprises a peripheral annular recess moulded externally in the body for sealing engagement, as a snap fit, in an aperture in a wall of a vessel to which the valve is to be connected.

10. A valve according to claim 9 wherein said mounting means comprises a flange of said elastomeric material that defines, in part, said peripheral recess and that can be resiliently deformed for insertion through said aperture during snap fit mounting of the valve.

11. A ball valve essentially of two-part construction comprising:

a) a first part being a unitary body moulded in elastomeric material and defining within it a spherical cavity, a first fluid flow passageway extending axially in one direction from the cavity to a fluid inlet port, a second fluid flow passageway extending axially in the opposite direction from the cavity to a fluid outlet port, and a third passageway extending through the body to said cavity and orthogonally to said first and second passageways, said body having integrally moulded therewith mounting means adjacent to said inlet port for mounting said body in snap fit, sealing engagement with a wall of a vessel to which the valve is to be connected; and b) a second part being valve closure means for progressively and resiliently deforming said elastomeric material by moving along said third passageway towards said cavity to locate said means in said cavity as an interference fit, said valve closure means including a valve closure ball moulded in relatively rigid plastic material having an actuating spindle integrally moulded therewith, said spindle extending through and projecting from said third passageway and having an external handle integrally moulded therewith, said ball having a diametric bore therethrough and being rotatable by rotation through substantially 90° of said spindle about its axis between a valve-closed position in which said diametric bore is out of register with said first and second passageways and a valve-open position in which said bore is aligned with and interconnects said first and second passageways and hence the fluid inlet and outlet ports.

* * * * *